United States Patent [19]

Gühring

[11] Patent Number: 4,704,055
[45] Date of Patent: Nov. 3, 1987

[54] DRILL WITH COOLING CHANNEL

[75] Inventor: Knut Gühring, Albstadt, Fed. Rep. of Germany

[73] Assignee: Gottlieb Guhring, Ebingen, Fed. Rep. of Germany

[21] Appl. No.: 573,860

[22] Filed: Jan. 25, 1984

[30] Foreign Application Priority Data

Feb. 8, 1983 [DE] Fed. Rep. of Germany ....... 3304277
Mar. 18, 1983 [DE] Fed. Rep. of Germany ....... 3309860

[51] Int. Cl.$^4$ ......................... B23B 51/02; B23B 51/06
[52] U.S. Cl. ...................................... 408/59; 408/144; 408/230
[58] Field of Search ................ 408/204, 206, 59, 144, 408/230, 83; 407/11, 118, 119

[56] References Cited

U.S. PATENT DOCUMENTS

| 2,422,994 | 6/1947 | Taylor | 408/59 |
| 2,555,302 | 6/1951 | Cogsdill | 408/59 |
| 2,674,908 | 4/1954 | Willingham | 408/204 |
| 2,935,906 | 5/1960 | Andreasson | 408/59 |
| 3,040,605 | 6/1962 | Andreasson | 408/59 |
| 3,073,189 | 1/1963 | Daige | 408/59 |
| 3,359,837 | 12/1967 | Andreasson | 408/230 |
| 3,555,935 | 1/1971 | Dorrenberg | 408/59 X |
| 3,606,560 | 9/1971 | McClennan | 408/59 |
| 3,791,660 | 2/1974 | Bostley | 408/59 X |
| 3,912,414 | 10/1975 | Fukura et al. | 408/144 |

FOREIGN PATENT DOCUMENTS

| 3200674 | 2/1982 | Fed. Rep. of Germany | 408/59 |
| 0035484 | 3/1979 | Japan | 407/119 |
| 56-21711 | 2/1981 | Japan . | |

Primary Examiner—Z. R. Bilinsky
Attorney, Agent, or Firm—Anthony H. Handal

[57] ABSTRACT

A drill is described having a metal bit carrier part on which a sintered metal bit is placed. The bit possesses at least one enclosed helical cooling channel which continues in alignment into a corresponding cooling channel in the bit carrier part. This drill is particularly characterized by very great mechanical and thermal stability, which is not adversely affected in any way by the system of cooling channels in the interior of the drill, so that the service life and cutting power of the drill can be greatly increased. These advantages apply both to twist drills proper and to single-lipped deep-hole drills, for which there is the particular advantage that the geometry of the drill head can be optimally adapted to the particular material to be processed.

13 Claims, 8 Drawing Figures

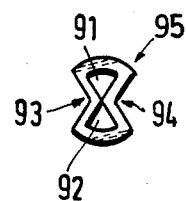
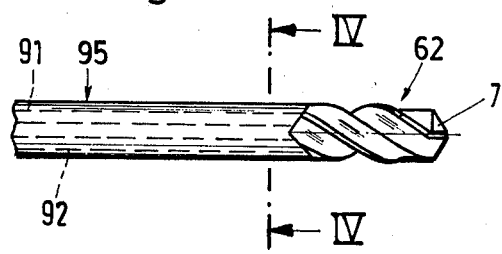
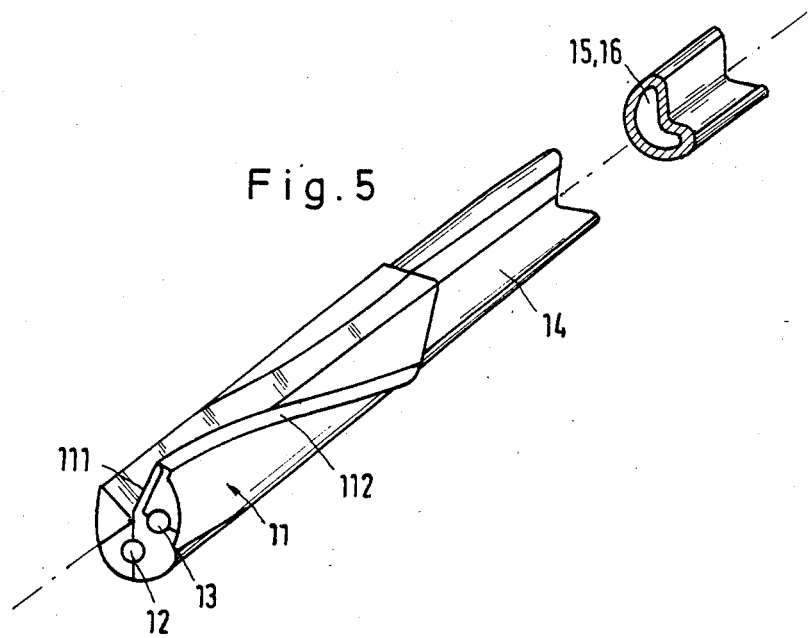
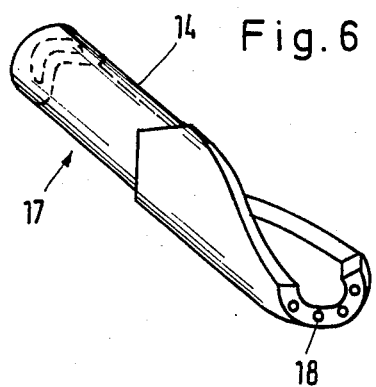
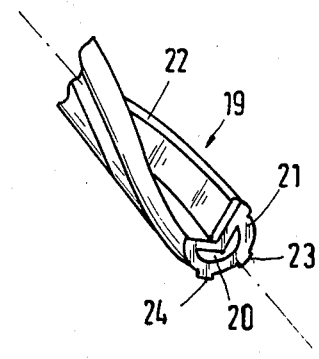

DRILL WITH COOLING CHANNEL

The present invention relates to a drill and to a method of producing a drill.

Such tools are being increasingly used in particular for the processing of materials which are difficult to process, such as aluminum materials with a high silicon content, since very sturdy tools with very high cutting power are required for this purpose. The main advantage of these known drills is that parts of the drill which are variously stressed may be executed in the specific materials which best meet these various requirements. Thus the carbide bit is characterized by great rigidity, whereas the metal carrier part for the bit is of relatively great elasticity and ductility while still being very resistant to abrasion. However, when these known tools are used for drilling, very great thermal stress comes about both in the work piece and in the tool, which may lead to the drill seizing in the bore to be produced when the drill is operated at such high cutting speeds which the drill materials used could readily withstand. This means, in other words, that the positive properties of the materials used in the known drills can only be exploited to a limited extent.

It is an object of the invention to provide a drill having even greater cutting power and improved exploitation of the combination of materials used.

According to the invention the main cutting edges of the drill may be cooled with extreme intensity while the minor cutting edge path is still optimally designed, thus assuring such high heat dissipation from the main cutting edge that the cutting speed of the drill can approach the very high mechanical load limit of the bit without any thermal overstressing being expected. This applies to all types of single- or multi-lipped drills, including, for example, twist drills and single-lipped deep-hole drills. It is a particular advantage of the invention that the bit may be optimized geometrically with respect to the greatest stability and most favorable cutting force curve without any detrimental effect on the coolant supply. When applied to a twist drill the cooling channels are arranged according to the invention in the spiral-shaped bit in such a way they do not interfere in any way with the efficiency of the twist drill. The diameter of the drill core may also be kept relatively small, thus creating favorable conditions for chip removal. On the other hand, all transitional channels which might weaken the drill parts between the cooling channels in the bit and in the cutting part, which is also twisted, are now superfluous, which also increases the maximum turning moment transferred by the drill. The efficiency of the drill is not reduced, either, by an extension of the bit, i.e. a very long bit may be provided without any reduction in the efficiency of the cooling channels. The transitional area between the bit and the cutting part of the drill may also be designed so as to be completely free of the lubricant channel with a view to an optimal flux of force. At the same time, the flutes in the bit may still be relatively deep without any noticeable reduction in the rigidity of the twist drill, so that chip removal remains very favorable at a high transferable torsional moment. Because the bit is now no longer bound by any specific limiting dimensions, even for extremely high cutting power, it is also possible to repoint the drill several times, so that the carbide bit can be used much more economically.

Due to the favorable stressing and flux of force conditions in the transitional area between the bit and the cutting part the latter is particularly well-suited for producing very deep and thin bores.

The number of cooling channels in the drill does not have a negative effect on the solidity of the twist drill due to the inventive measures, either, because each spiral-shaped cooling channel can be directed to the shank in its own duct and without any intermediate channels which might weaken the drill; at the same time, each cooling channel may be separately supplied with a sufficient quantity of coolant or lubricant without affecting the supply of other cooling channels.

The design of the bit which may be freely optimized according to the invention even opens up the possibility of designing the drill in such a way that the flutes running spirally in the area of the bit turn into straight flutes in the carrier part for the bit. This involves the additional advantage that a universal or standard shank having only straight cooling channels may be used for different bits optimally adapted to the particular cutting conditions. The economic advantages obtainable in this way are obvious. There is also the additional advantage that the length of the cooling channels and furthermore the flow losses in these channels as well may be reduced by this straight-fluted bit carrier part. At the same time, the cross-section of the cooling channels in the bit carrier part may also be designed more freely, leading to an additional increase in the cooling effect, or rather cooling and lubrication efficiency.

According to the invention a very powerful twist drill which can be produced less expensively and has improved lubrication power. The position and path of the cooling channels corresponds to this shank and bit combination in that there is maximum constructional freedom for optimizing the connecting surfaces when designing the transition between the bit and the bit carrier part.

This principle may also be applied to particular advantage in the field of deep-hole drills. The cutting edge geometry of such a drill may be designed to match the particular materials to be processed as far as the optimal cutting conditions are concerned. Up to now, cooled carbide deep-hole bits have been exclusively used having a tool side rake of 0 degrees. The inventive design of the cooling channels now makes it possible to adapt the tool side rake individually to the material to be processed, without having to shorten the bit. This is particularly important in the case of deep-hole drills because here the drill head requires good and axially long guidance in the bore hole. The drill head may also be provided with several cooling channels, each continuing in true alignment into lubricating channels in the bit carrier part. In this way each lubricating channel has an optimal connecting channel in the bit, which may serve as a supply or runback channel. The above-mentioned advantage, that the bits designed with different cutting geometries may be used in combination with a universal or standard shank, also applies to this area of application. In particular in the case of deep-hole drills operating with high-pressure lubricant supply, this involves the further additional advantage that a standard coolant connecting sheath for the drill shank may also be used.

It is true that it is known to provide a twist drill having a bit made of rigid steel with enclosed cooling channels. But this type of tool never fails to possess a central lubricant channel in the cutting part of the drill, in which the separate cooling channels of the bit are united.

This design leads, on the one hand, to the diameter of the drill core having to be kept relatively large in the area of the cutting part in order to provide sufficient solidity with a predetermined cooling capacity. This is detrimental to the depth of the flutes and thus to chip removal capacity. On the other hand, uniting the lubricant channels demands transitional channels in the drill which must always run radially and often even diametrically, and this reduces the turning moment to be transferred and thus the mechanical stability of the drill as a whole.

In accordance with another feature of the invention, a drill, whether it be a twist drill or a single- or double-lipped deep-hole drill, possesses the necessary surface strength, ductility and elasticity precisely where this is most required in each particular case. The high chip removal forces proceeding from the extremely stable bit can be reliably absorbed by the metal bit carrier part, especially as these materials provided for the carrier part are very well-suited for connection with the carbide bit.

The carbide bit having a cooling channel spiral, molded in, for example, by the extrusion molding method, can be processed on the outside without any great difficulty after sintering, so that the transitional surfaces between the bit and the bit carrier part can also be constructionally optimized. A prism face connection has proved to be especially advantageous since a large contact surface is thus provided between the parts to be connected, on the one hand, and overstressing of the sintered metal, which is relatively sensitive to tensile and contact force, is thus prevented, on the other.

It has turned out that when the sintered metal bit is put on in a positive locking manner, for example by means of a prism face connection very good results are obtained with a soldered joint, even when the bit forms the drill head of a deep-hole drill operated with extremely high thrust forces.

The cutting power of the inventive drill can be additionally increased by providing the bit with a PVD or CVD coating before placing it on or soldering it to the bit carrier part. Such coatings consist, for example, of titanium nitride or titanium carbide.

The production of a sintered metal blank involves relatively little effort; furthermore, this blank can be processed very easily and thus economically before sintering.

Cooling channel recesses can be worked in using either metal cutting tools or metal forming tools.

The method can be applied in an advantageous manner in particular when fine-grain carbides are used; the cooling channel recess or recesses can be extruded as well during the extrusion process or else subsequently worked into the finished blank when it is cut to size.

The method further reliably prevents solder from penetrating into the coolant channels with capillary action when the soldered joint is produced between the bit and the bit carrier part. The solder rejecting medium may be removed chemically or mechanically following the soldering process.

In the following, several embodiments of the invention shall be explained in more detail with reference to schematic drawings wherein:

FIG. 3 is a side view of a slightly modified form of a twist drill having a carbide spiral bit and a straight-fluted bit carrier part.

FIG. 4 is a cross-sectional view of the drill shown in FIG. 3, cut along line IV—IV in FIG. 3.

FIG. 5 is a view in perspective of deep-hole drill having a carbide bit with a positive tool side rake.

FIG. 6 is a view in perspective of another deep-hole drill having a carbide bit with a positive tool side rake.

FIG. 7 is a view in perspective of still another deep-hole drill having a carbide bit with a positive tool side rack.

Figure 1A:
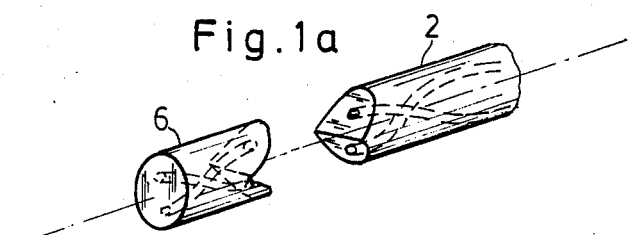
FIG. 1a is a schematic view to illustrate an advantageous design of the prism face connection between the bit and the bit carrier part.
Figure 1:
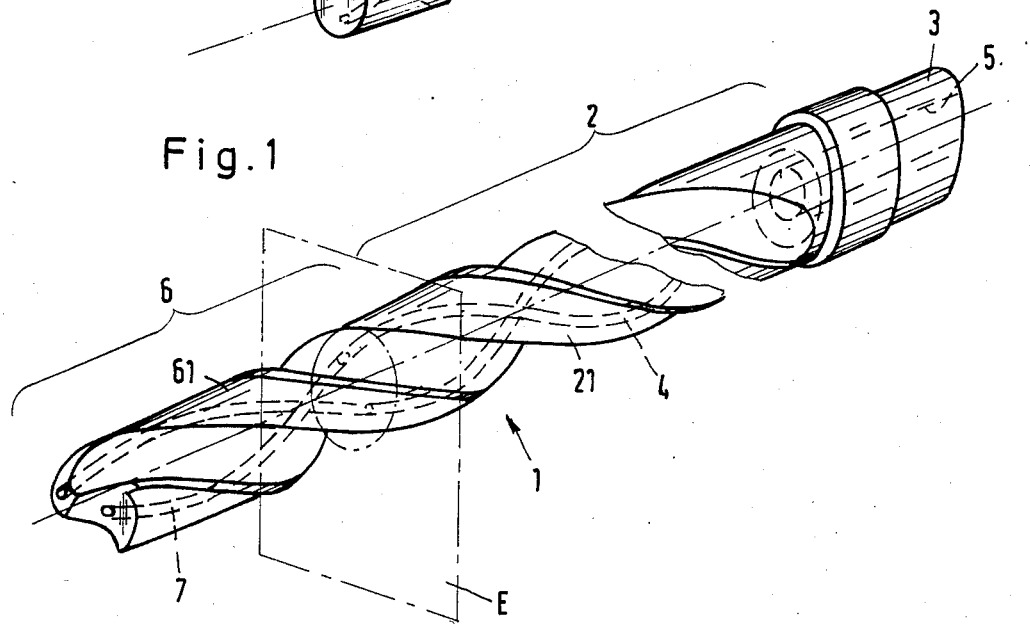
FIG. 1 is a view in perspective of the drill in the embodiment as a twist drill.

FIG. 1 shows a twist drill 1 having a metal bit carrier part 2, which in this case is designed as a drill cutting part and runs into a drill shank 3. In drill cutting part 2 there are spiral-shaped cooling channels or lubricating channels 4 located in webs 21, the channels running into a central lubricant supply bore 5 in the area of shank 3. A carbide bit 6 is placed, for example, soldered or welded, on drill cutting part 2.

Carbide bit 6 is made of sintered metal. Bit 6 is produced, for example, by the extrusion molding method, spiral-shaped cooling channels 7 being molded into the blank, for example, at the same time as the extrusion process for the sintered metal blank forming the bit. Cooling channels 7 thus also extend through webs 61 of bit 6.

Figure 2:
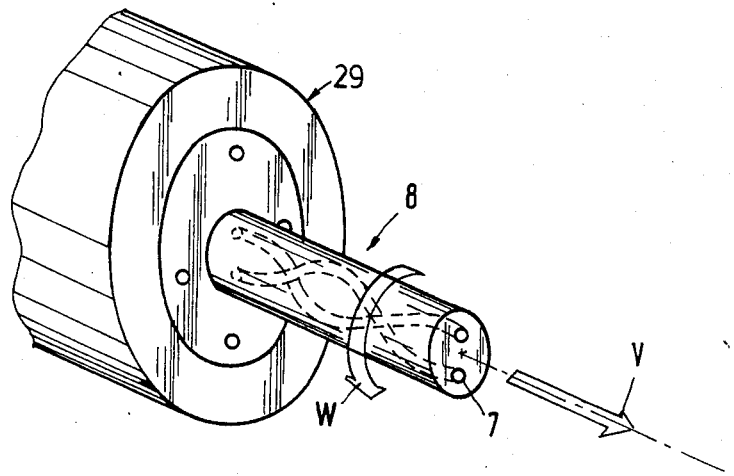
FIG. 2 is a view in perspective of a sintered metal blank extruded from an extruding device.

The carbide bit is produced, for example, by extruding a circular cylindrical sintered metal blank 8 by means of an extruding device 29, in which a press-form nozzle is arranged. For the production of one or more spiral cooling channels 7 corresponding to the number of drill cutting edges, sintered metal blank 8, when it comes out of extruding device 29, is twisted at an angular velocity $\omega$ (cf. FIG. 2) corresponding to flow of materal v (cf. FIG. 2), the desired geometry of the drill and the spiral path of cooling channels 4 in drill cutting part 2, resulting in a metal blank 8 which is still cylindrical and already contains spiral lubricant channel recesses 7. The twisting is carried out by a twisting device, which is not shown in more detail, preferably provided with means to assure constant and even guidance of sintered metal blank 8 and a twisting motion which is also continuous and constant. After extrusion of sintered metal blank 8, the latter is cut into lengths of predetermined dimensions and sintered in a vacuum furnace, preferably in such a way that the sintered metal blank pieces cut to size are placed on graphite plates and sintered on them. The sintering process for these blanks generally involves dimensional changes due to shrinkage. In a few experiments the dimensional stability can be precisely ascertained for a given drill gemoetry, so that the parameters of the machine or apparatus can then be optimally adjusted.

When the dimensional stability of sintered metal blanks 8 is ascertained by experimentation, one can also precisely deduce the spiral path of cooling channels 7 in the interior of blank 8. When this path is known, the spiral flute of the drill can then be worked in using a conventional metalcutting machine tool such as a grinding machine. The extrusion tool is selected in such a way that after sintering, cooling channels 7 in bit 6 lie on the same radius and have the same diameter as spiral cooling channels 4 in metal cutting part 2. This can be reliably obtained by experimentation and by influencing the sintered metal powder mass.

During the final processing of the flutes in the area of bit 6, the bit and the transitional area to metal cutting part 2 facing away from the bit are also pointed. In FIG. 1, the transitional section between bit 6 and metal cutting part 2 is merely indicated schematically by plane E shown in dot-dash lines. This representation is intended to express that the spiral cooling channels 7 and 4 run into each other in true alignment and without any progressive ratio in contact planes E.

The contact surface between bit 6 and cutting part 2 may be formed, by example, by a cone-shaped shell surface. However, a prism face connection as shown schematically in FIG. 1a has proved to be particularly advantageous. For this connection, parts 6 and 2 to be connected with each other—the design of their connecting surfaces being interchangeable—are processed in such a way that they interlock with the contact surfaces. Spiral cooling channels 7 and 4 should come to lie as close to the center of the particular contact surface as possible. Parts 6 and 2 to be connected are either soldered or welded via the contact surfaces.

The drill cutting part is made of abrasion-proof, ductile steel, for example an unalloyed or low-alloy tool steel, a high speed tool steel, a nitriding steel or another familiar tool steel possessing sufficient elasticity, skin hardness and toughness.

Deviating from the embodiment shown in the figures, the twist drill may also be designed as a deep-hole drill or as a twist drill having only one spiral coolant or lubricant channel.

The design of connecting surface E may of course be optimized constructionally with a view to improving the flux of force and protecting the sintered metal bit 6 as much as possible.

Bit 6 can also be produced in a different manner as a variation of the embodiment described above. For example, a sintered metal blank in a raw state, i.e. in an unsintered state, can be provided with straight coolant or lubricant channel recesses. In an unsintered state this can be done with relatively little effort using metal-cutting tools. The straight cooling channels may, however, also be molded in during the extrusion of the blank. After the blank cut into lengths of given dimensions has been sintered, it is twisted under the influence of temperature in a similar manner as a twist drill strictly of metal, in such a way that the desired spiral pitch is obtained.

When a relatively short bit is to be placed on the drill cutting part, it suffices to design the cooling channels in the bit in a straight line in webs 61. This design can again be carried out using metal-cutting tools.

When connecting the contact surfaces between bit 6 and drill cutting part 2 it is best to close off with a solder rejecting medium, before soldering, cooling channels 7 and 4 located opposite each other in true alignment. This solder rejecting medium may be formed, for example, by a bar-shaped body which extends through cooling channels 7 in bit 6 and protrudes beyond connecting surface E to a sufficient degree to be capable of extending into the corresponding cooling channel spiral 4 of drill cutting part 2. After conclusion of the soldering process, the bar-shaped body is extracted from the twist drill, so that cooling channel 7 and 4 emerges devoid of any cross-sectional reductions from the bit to shank 3.

After the bit has been soldered on, its flute and cutting edges are ground to their final dimensions.

FIGS. 3 and 4 show a further embodiment of the drill, designed again as a twist drill. This twist drill has a bit 62 which has an identical design to the bit described above with reference to FIGS. 1 and 1a. Bit 62 again form-fits via a prism face connection a bit carrier part 95 which, like carbide bit 6, has enclosed coolant channels 91 and 92. Bit carrier part 95 is formed in this case by a double-crease tube exhibiting straight chip removal flutes 93 and 94. Coolant channels 91 and 92 run into the respective coolant channels 7 of the bit in true alignment and without any change in area. The tube is made of quenched and subsequently drawn steel and is preferably a rolled steel tube.

Bit carrier part 95 shown in FIGS. 3 and 4 can thus serve as a universal and standard shank for a great variety of twist drills in which only the bit is adapted to the particular task at hand. Instead of the twist drill head shown a double-lipped deep-hole drill head may also be placed on it, which is likewise twisted.

FIG. 5 shows a further embodiment of the drill, which in this case is designed as a single-lipped drill which is mainly used when extremely exact and deep bore holes are to be produced. This drill can be used as a solid bit, core or corehole drill.

Drill head 11 shown in FIG. 5 is made of carbide and exhibits enclosed coolant or lubricant channels which run in a spiral starting at the front surfaces in the interior of the drill head. These channels 12 and 13 run in alignment into a lubricant channel 15 or 16 of a deep-hole drill shank 14 which may be designed as a solid or tubular shank. Bit 11 is again soldered onto drill shank 14 via a prism face connection. A spiral-shaped longitudinal land 112 extends from main cutting edge 111.

It can be seen in FIG. 5 that carbide bit 11 has a positive or non-zero tool side rake. The tool side rake of drill head 11 is adapted to the particular material to be processed: for example, a very small tool side rake suffices when processing gray iron, but this tool side rake will assume considerable values for the processing of aluminum materials containing silicon. A relatively large twist of the drill head results with a minimum length of drill head 11 responsible for guiding drill head 11. However, this twist of the cutting edges and the enclosed cooling channels is no particular problem using the above-described methods of producing the bits.

In order to increase the chip removal capacity of drill head 11 further, it is particularly advantageous to provide the drill head with a PVD or CVD coating before it is soldered to shank 14 and after the final processing of the cutting edges. The abbreviation PVD stands for the specialized term "physical vaporite deposit" and the abbreviation CVD for the specialized term "chemical vaporite deposit". This kind of coating, which may contain titanium nitride or titanium carbide, for example, is vaporized onto the drill head. This coating of course also contributes to increasing the cutting power of the above-described drills as well, but it particularly important in the case of deep-hole drills to keep service life as long as possible since such tools are subject to extreme thrust forces.

Drill head 11 shown in FIG. 5 exhibits two spiral cooling channels which run in alignment into the straight cooling channels of shank 14. Instead of the two cooling channels 12 and 13 drill head 11 may also be provided with only one cooling channel extending spirally through head 11, whereby a reinforcement web may be provided in the case of particularly large cross-sectional areas of the cooling channels.

The invention thus provides a drill having a metal bit carrier part on which a sintered metal bit is placed. The bit possesses at least one enclosed helical cooling channel which continues in alignment into a corresponding cooling channel in the bit carrier part. This drill is characterized in particular by very great mechanical and thermal stability which is not adversely affected in any way by the system of cooling channels in the interior of the drill, so that the service life and cutting power of the drill can be greatly increased. These advantages apply both to twist drills proper and to single- or multi-lipped deep-hole drills, for which there is the particular advantage that the geometry of the drill head can be optimally adapted to the particular material to be processed.

According to the invention a particular advantage is the possibility, of providing straight-fluted universal shanks provided with hollows, onto which the various bits can be placed by means of prism face connection.

FIG. 6 shows a carbide bit of a single-lipped deep-hole core drill 17, from the front surface of which several coolant channels 18 again emerge, being supplied via hollow shank 14. The connection between shank 14 and the bit can again consist of a prism face connection by soldering.

FIG. 7 shows a view in perspective of a further embodiment of a single-lipped deep-hole bit 19, which, unlike the variant shown in FIG. 5, is provided with only one cooling channel 20 extending spirally from front surface 21 to the correspondingly adapted universal tubular shank (not shown).

This view clearly shows the likewise spiral-shaped longitudinal land 22 as well as stabilizing webs 23 and 24, whose position is selected according to the diameter of the bore to be produced. Webs 23, 24 and longitudinal land 22 are an integral part of drill head 19 made of carbide. Various modifications in structure and/or function and/or steps may be made by one skilled in the art to the disclosed invention without departing from the scope of the invention as defined by the claims.

I claim:

1. A twist drill comprising;
    bit carrying means having a longitudinal axis supporting a separate sintered metal bit at an interface between the carrying means and the bit and on an axis coaxial with the bit carrying means, the carrying means and the bit having a continuous spiral web forming cutting surfaces;
    at least one cooling channel disposed within the bit carrying means;
    at least one cooling channel disposed within the bit and extending helically about and radially spaced from the coaxial axis;
    the helical bit channel and the bit carrying channel being in continuous alignment at the interface so as to form an uninterrupted common cooling channel, wherein the bit carrying channel extends helically about and radially spaced from the longitudinal axis and through the web whereby the common cooling channel is helically continuous.

2. A drill according to any of claim 1, wherein the bit carrier means (2) is made of abrasion-proof ductile steel such as an unalloyed or low-alloy tool steel or a high speed tool steel or a nitriding steel or a rolled steel.

3. A twist drill according to claim 2 wherein a carbide bit is placed on the bit carrier means by means of a prism face connection at this interface.

4. A drill according to claim 2 wherein a carbide bit is soldered onto the bit carrier means.

5. A drill according to claim 2 wherein a carbide bit bears a PVD or CVD coating.

6. A twist drill according to any of claim 1, wherein a carbide bit (6; 11) is placed on the bit carrier means (2; 9; 14) by means of a prism face connection at the interface (E).

7. A drill according to claim 6 wherein a carbide bit is soldered onto the bit carrier means.

8. A drill according to claim 6 wherein a carbide bit bears a PVD or CVD coating.

9. A drill according to any of claim 1, wherein a carbide bit (6; 11) is soldered onto the bit carrier means (2; 9; 14).

10. A drill according to claim 9 wherein a carbide bit bears a PVD or CVD coating.

11. A drill according to any of claim 1, wherein a carbide bit (6; 11) bears a PVD or CVD coating.

12. A twist drill according to claim 1 wherein the interface is formed as complimentary prismatic surfaces.

13. A twist drill according to claim 12 wherein the interface includes a solder in the interface.

* * * * *